US011770411B2

(12) United States Patent
Thyagaraj et al.

(10) Patent No.: US 11,770,411 B2
(45) Date of Patent: Sep. 26, 2023

(54) PRIORITIZE ENDPOINT SELECTION BASED ON CRITERIA

(71) Applicant: KYNDRYL, INC., New York, NY (US)

(72) Inventors: Lohitashwa Thyagaraj, Bangalore (IN); Debasisha Padhi, Bangalore (IN); Richard Jay Cohen, Austin, TX (US)

(73) Assignee: KYNDRYL, INC., New York, NY (US)

(*) Notice: Subject to any disclaimer, the term of this patent is extended or adjusted under 35 U.S.C. 154(b) by 615 days.

(21) Appl. No.: 16/579,028

(22) Filed: Sep. 23, 2019

(65) Prior Publication Data

US 2021/0092157 A1    Mar. 25, 2021

(51) Int. Cl.
*H04L 9/40* (2022.01)
*G06F 8/65* (2018.01)
*G06F 9/48* (2006.01)

(52) U.S. Cl.
CPC .............. *H04L 63/20* (2013.01); *G06F 8/65* (2013.01); *G06F 9/4881* (2013.01); *H04L 63/1433* (2013.01)

(58) Field of Classification Search
CPC ....... H04L 63/20; H04L 63/1433; G06F 8/65; G06F 9/4881; G06F 9/5061; G06F 21/577
USPC ........................................................... 726/1
See application file for complete search history.

(56) References Cited

U.S. PATENT DOCUMENTS

| | | | | |
|---|---|---|---|---|
| 7,412,514 B2* | 8/2008 | Shuster | ............... | H04L 47/29 709/224 |
| 7,586,944 B2* | 9/2009 | Messick | ............ | H04L 41/0893 709/219 |
| 9,411,621 B2 | 8/2016 | Jeswani et al. | | |
| 10,187,492 B2 | 1/2019 | Thomas et al. | | |
| 10,491,632 B1* | 11/2019 | Natarajan | ............. | H04L 63/105 |
| D947,851 S * | 4/2022 | Akana | ......................... | D14/439 |

(Continued)

FOREIGN PATENT DOCUMENTS

CN        106534284 A  *  3/2017   .........  H04L 67/1008

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Kambiz Zand
*Assistant Examiner* — Aubrey H Wyszynski
(74) *Attorney, Agent, or Firm* — Tutunjian & Bitetto, P.C.; Erik Swanson

(57) ABSTRACT

A method, system, and computer program product for prioritizing endpoints to be checked during a change window based on certain criteria. The method may include receiving a request for processing from a plurality of servers. The method may also include determining a priority for each server of the plurality of servers based on specified criteria, where the specified criteria includes at least compliance-check history. The method may also include determining whether each server belongs to one or more groups. The method may also include determining a notification order for the plurality of servers based on the priority and whether each server belongs to the one or more groups. The method may also include sending a notification to each server in the notification order.

19 Claims, 6 Drawing Sheets

(56) References Cited

U.S. PATENT DOCUMENTS

| | | | |
|---|---|---|---|
| 2003/0069831 A1* | 4/2003 | Le | G06Q 40/04 |
| | | | 705/37 |
| 2006/0080656 A1* | 4/2006 | Cain | G06F 8/65 |
| | | | 434/118 |
| 2008/0177912 A1* | 7/2008 | Onda | G06F 11/0793 |
| | | | 710/68 |
| 2008/0222631 A1* | 9/2008 | Bhatia | G06F 11/3604 |
| | | | 717/178 |
| 2014/0208314 A1* | 7/2014 | Jeswani | G06F 9/45533 |
| | | | 718/1 |
| 2016/0088021 A1* | 3/2016 | Jayanti Venkata | H04W 4/50 |
| | | | 726/1 |
| 2017/0005856 A1* | 1/2017 | Thomas | H04L 67/535 |
| 2017/0083165 A1* | 3/2017 | Ali | H04L 41/0609 |
| 2021/0092157 A1* | 3/2021 | Thyagaraj | G06F 21/577 |

\* cited by examiner

PRIORITIZE ENDPOINT SELECTION BASED ON CRITERIA

BACKGROUND

The present disclosure relates to compliance-checking, and more specifically to prioritizing endpoints to be checked during a change window based on certain criteria.

SUMMARY

The present invention provides a computer-implemented method, system, and computer program product to prioritize endpoints to be checked during a change window based on certain criteria. The method may include receiving a request for processing from a plurality of servers. The method may also include determining a priority for each server of the plurality of servers based on specified criteria, where the specified criteria includes at least compliance-check history. The method may also include determining whether each server belongs to one or more groups. The method may also include determining a notification order for the plurality of servers based on the priority and whether each server belongs to the one or more groups. The method may also include sending a notification to each server in the notification order. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
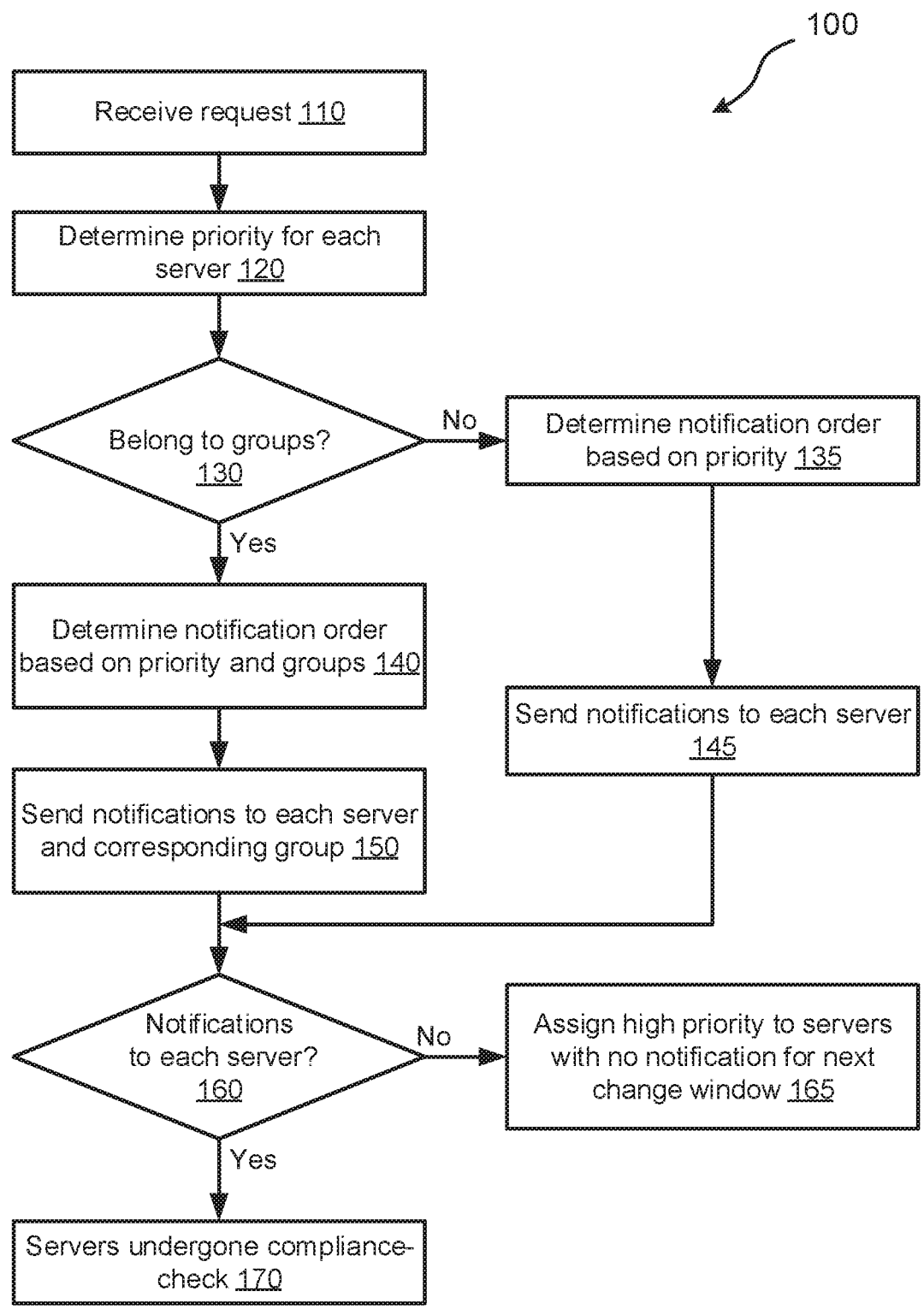
FIG. 1 depicts a flowchart of a set of operations for prioritizing endpoints to be checked during a change window, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to compliance-checking, and more specifically to prioritizing endpoints to be checked during a change window based on certain criteria. While the present disclosure is not necessarily limited to such applications, various aspects of the disclosure may be appreciated through a discussion of various examples using this context.

In customer deployment, a large number of servers (e.g., 1000 to 20,000), also referred to herein as "endpoints," may be actively running to manage customer applications. To prevent security vulnerability, all the servers may be in a state of continuous compliance, which may include ensuring that the latest security patches are applied. To apply the necessary security patches, customer applications, or customer accounts, may configure a change window, or a time period during which deviations can be fixed and/or new patches can be applied. The change window may be a time period during which a business will be minimally impacted due to unavailability of servers. The change window may be the only time period during which compliance-checks (e.g., fixing deviations, applying new patches, etc.) are executed. Depending on the quantity and complexity of the compliance-checks and fixes, remediation for each server may take various periods of time (e.g., 10-15 minutes). Because the change window is a set period of time, not all fixes and compliance-checks may fit within the change window. Further, within the period of time a server is being fixed, the server may send information to a compliance server (e.g., a Chef server) to share its state and necessary actions to be taken to gain/maintain compliance.

Because of bandwidth limitations, customers may restrict bandwidth usage between the compliance server and customer endpoints/servers. These bandwidth limitations may make it difficult, if not impossible, for all customer endpoints, or servers, to be checked for compliance within the change window. For example, a customer may restrict network bandwidth to 1 or 2 megabytes per second (MBps). In this example, a customer may have 10,000 endpoints (or servers) and each endpoint may exchange between 5 and 10 megabytes (MB) of data between the endpoint and compliance server. If the bandwidth is limited to 1 or 2 MBps, it may be very unlikely that all 10,000 endpoints/servers may be processed within the specific change window (e.g., 3 hours). Thus, because of bandwidth limitations, it may be difficult to maintain that all endpoints stay in a compliant state (e.g., with a secure configuration and required security patches applied).

The present disclosure provides a computer-implemented method, system, and computer program product to prioritize endpoints to be checked during a change window. In some embodiments, the same compliance-check may be executed during multiple change windows. In some embodiments, a new compliance-check is executed during each change window.

By prioritizing, or assigning priority, to servers based on different criteria, the servers may effectively leverage the network bandwidth available. Servers with high priority may perform their compliance-checks first (e.g., by receiving a notification from a compliance server) and other, lower priority, servers may not perform their compliance-checks until after the high priority checks have been completed. Based on different criteria, some servers (e.g., lower priority servers) may be checked at less frequent intervals than other, higher priority servers. The lower priority servers that have not been checked may be reprioritized (in some embodiments, automatically) in order to increase the likelihood that the lower priority servers are able to get checked or patched in the next change window, therefore maintaining compliance.

Referring now to FIG. 1, a flowchart illustrating a method 100 for prioritizing endpoints to be checked during a change window is depicted, according to some embodiments. In some embodiments, method 100 is executed by a compliance server (e.g., compliance server 205 (FIG. 2) and/or compliance server 305 (FIG. 3)). In some embodiments, the method 100 is implemented as a computer script or computer program (e.g., computer executable code) to be executed by the orchestrator on or connected to a computer system (e.g., computer system 400 (FIG. 4)). In some embodiments, the compliance server is a computer device, such as computer system/server 402 (FIG. 4). In some embodiments, the compliance server is a server within a cloud computing environment (e.g., cloud computing environment 50 (FIG. 5)).

In some embodiments, the compliance server is configured to execute operation 110 to receive a request for processing. The request for processing may be received from a plurality of servers (for example, from every customer server). In some embodiments, during a processing state (e.g., the change window), the customer servers may wake up and attempt to connect to the compliance server. When the servers are attempting to connect to the compliance server, they may send a request for processing to the compliance server. In some embodiments, the request for processing may be a request to undergo a compliance-check. Receiving the request for processing may onboard the servers to the compliance-check, in some embodiments.

In some embodiments, the compliance server is configured to execute operation 120 to determine priority for each server. Once the compliance server has received the requests for processing from the servers, the compliance server may determine the priority of each server. The priority may be the importance for a sever to undergo the compliance-check. In some embodiments, determining the priority is based on various specified criteria, including at least compliance-check history. The compliance-check history may include the history of compliance-checks for the servers, such as which servers were processed and/or had undergone compliance-checks, along with the servers that were not processed, during prior change windows. In some embodiments, priority of the server(s) that were not processed in the previous compliance-check may be increased in order to increase the likelihood that all servers are compliant and patched. This would help to avoid the same servers being continuously skipped during each change window, which could lead to servers not being compliant.

In some embodiments, the criteria may be defined by the customer (e.g., an account, a company, etc.). In some embodiments, the compliance server may have predefined criteria to determine the priority. In some embodiments, the specified criteria may include at least one of usage statistics, risk level, business criticality of a service, and changes to network bandwidth.

Usage statistics may include data indicating the amount of use of each server. For example, certain servers may be used extremely frequently and other servers may not be used at all, or minimally. The most used servers may be given a higher priority than the least used servers, in some embodiments. In conventional compliance-checking, the least used servers may be checked/processed last for compliance. Due to bandwidth limitations, the least used server(s) may almost never be checked for compliance, and therefore may become noncompliant. Because compliance-check history is also used as a criteria to determine priority, the servers with the least use may still be checked (at least occasionally) for compliance, therefore maintaining compliance among all the servers.

Risk level may be the risk of each server of becoming noncompliant. Based on the application run on a server, type of work a server is doing, and/or other factors, a server may have a higher risk or vulnerability (e.g., security vulnerability). The servers with high risk/vulnerability may have a higher risk level, and therefore may have a higher priority than low risk level servers.

Business criticality of a service may be the importance of a service to a customer. The business criticality may correspond to the servers that execute the specific service. For example, a customer may be a banking business. One service that may have a high importance to the banking business may be depositing money. The servers that correspond to the service of depositing money may be given a higher priority than servers corresponding to playing music, for example.

Changes to network bandwidth may include any addition, subtraction, etc. to the bandwidth that has been allocated (for example, by the customer) for compliance-checking. Changes to the amount of bandwidth for compliance-checking may affect the priority of each server. For example, additional bandwidth may be added, or allocated, to compliance-checking by the customer. If more bandwidth is added, more servers may have the ability to be checked for compliance. In some instances, when more bandwidth is added, more servers may be given a higher priority because more servers are able to be checked for compliance.

In some embodiments, an algorithm is used to determine the priority of each server. The algorithm may weight each factor (e.g., using an importance indicated by the customer, using data of compliance-check history, etc.). In some embodiments, the algorithm is a machine learning algorithm that is continuously training/learning using data and results from previous compliance-checks. Using the weighting, various servers may be checked at more frequent intervals than others. For example, a server, or servers, that correspond to an application that is not business critical may be checked once a week in order to remain compliant. Using the weighting on the various criteria, including the compliance-check history, the servers that are not business critical may be given a low priority the majority of the time, but may be given a high priority approximately once a week, in order to increase the likelihood that the servers are still checked for compliance and maintain compliance.

In some embodiments, each server is assigned a new priority during each change window (i.e., dynamic assigning). The dynamic assigning of priority may help ensure that each server does not keep the same priority and therefore does not go too long without undergoing a compliance-check, which could result in noncompliant servers.

In some embodiments, the compliance server is configured to execute operation 130 to determine whether each server belongs to one or more groups. In some embodiments, servers may be grouped together, or allocated into, group(s) based on the various criteria, discussed above. For instance, servers may be grouped together based on usage statistics, compliance-check history, etc. In some embodiments, servers may be grouped together based on the applications they manage/host. For example, servers that manage a same application may be allocated into a group. In another example, servers that are used the same/similar amounts may be allocated into a group. In another example, servers that were checked for compliance during a same change window, or servers that need to be checked for compliance at the same frequency, may be allocated into a group. In some embodiments, a server may be part of one or more groups.

In an example embodiment, it may be determined that a group includes a plurality of servers that host a same application. In other words, servers that host/manage the same application may form a group. Determining whether each server belongs to one or more groups may include determining whether each server hosts an application and determining whether other servers from the plurality of servers host the same application. For example, it may be determined that a first server may host application A, a second server may host application A, and a third server may host application B. Because both the first server and the second server host the same application, it may be determined that the first server and the second server belong to the same group.

In another example, it may be determined that a first server and a second server are used a minimal amount (i.e., have the same/similar usage statistics). Because the first server and the second server have similar usage statistics, the first server and the second server may be grouped together, or may belong to the same group.

In some embodiments, the compliance server is configured to execute operation 140, in response to determining that at least one server from the plurality of servers belongs to one or more groups, determining a notification order for the servers based on the priority and the groups. If it is determined that a server, or multiple servers, belong to a group, or various groups, of servers, both the priority and the groups may be used to determine a notification order. A notification order may be the order of servers to which the compliance server sends a notification for the compliance-check. As discussed herein, there may be limited bandwidth, and limited time (i.e., a change window) for a compliance-check. Therefore, each server may not be able to undergo a compliance-check in a single change window. The compliance server may send a notification for the compliance-check to select server(s) at a time in order to regulate bandwidth, etc., so the notification order may be the order in which the notifications are sent. In some embodiments, the servers at the top of the notification order are the servers with the highest priority, and the notification order may be in order of the priority of each server.

In some embodiments, a server may belong to one or more groups. When a server belongs to a group, or groups, of servers, each server in the group may be given a same spot in the notification order. In other words, a first server may be assigned a certain spot (e.g., a first spot) in the notification order and each server that is a part of the same group(s) as the first server may be assigned the same spot (e.g., the first spot) in the notification order. Giving each server that is part of a group of servers the same spot in the notification order may help increase the likelihood that each server that is part of the group is checked for compliance at the same/similar times. This may help maintain compliance for each server. For example, if a plurality of servers all host the same applications, then the plurality of servers may be grouped together, and may be given the same spot in the notification order. Therefore, the application, and its corresponding servers, may maintain compliance and may have the same compliance. This may prevent an application from being noncompliant because of some servers having been checked and other servers not having been checked for compliance.

In some embodiments, the compliance server is configured to execute operation 150 to send notifications to each server and corresponding group. Once the notification order has been determined, the compliance server may send notifications for a compliance-check in the notification order. The notifications may be sent during the change window. In some embodiments, the notifications may only be sent to a server, or a few servers, at a time. For instance, the notification may be sent to a first one or more servers that are in a first spot of the notification order. The notification may include instructions for the server to perform a compliance-check. Once the compliance-check has been completed, the one or more servers may send the results of the compliance-check back to the compliance server. The compliance server may receive the results of the compliance-check and may, in response to receiving the results, send a notification to a second one or more servers that are in the next spot (e.g., a second spot) in the notification order. Therefore, only a few servers may be checked for compliance at once (or at a certain time), which may help save/maintain bandwidth for the change window.

In some embodiments, when a server is part of one or more groups of servers, and when it is the server's spot in the notification order, notifications may be sent to the server along with each server that is part of the same one or more groups of servers. For instance, sending the notification to each server in the notification order may include sending a first notification to the first server as well as each server of the one or more groups of servers. In some embodiments, the notification is sent at the same time (e.g., a first time) within a change window.

In some embodiments, if it is determined that none of the servers belong to any groups (in operation 130), the compliance server is configured to execute operation 135 to determine notification order based on priority. If none of the servers belong to any groups, or are not grouped together, then the priority of the servers may be used to determine the notification order. In other words, the notification order may be in order of the priority of each server. For example, the server(s) with the highest priority have the first spot(s) in the notification order and the server(s) with the lowest priority have the lowest spot(s) in the notification order.

In response to determining a notification order based on the priority, the compliance server may execute operation 145 and send notifications to each server. The instructions, as discussed herein, may be sent to the servers in the notification order. The servers at the top of the notification order may be notified, and therefore undergo the compliance-check, first, and the other servers may have to wait for the first compliance-checks to be complete before they receive their notification for the compliance-check.

In some embodiments, once notifications are sent (either in operation 145 or 150), the compliance server is configured to execute operation 160 to determine whether notifications were sent to each server. Determining whether notifications were sent may help the compliance server maintain the compliance-check history for the servers. To determine whether notifications were sent to each server, the compliance server, once the change window has expired, may analyze the notification order and determine which notifications were sent out.

If it is determined that notifications were sent to each server, in operation 160, then the compliance server may execute operation 170 and determine that all servers have undergone a compliance-check. If notifications were sent to each server, then each server may have undergone a compliance-check. Once a server receives a notification, a server may start executing a compliance-check. The notification may include instructions to execute the compliance check, in some instances. In some embodiments, executing a compliance-check includes determining whether or not a server is in compliance. In some embodiments, executing a compliance-check includes fixing non-compliant servers. In some embodiments, if notifications have been sent to each server, each server may have undergone a compliance-check and each server may be in compliance.

If it is determined that notifications were not sent to each server, in operation 160, then the compliance server may execute operation 165 and assign high priority for the next change window to servers that did not receive a notification. The servers that did not undergo a compliance-check during the first change window may need to undergo a compliance-check in the next (e.g., second) change window, or the next few change windows, in order to maintain compliance. Therefore, the compliance server may, for example, assign a high priority, for the second change window, to each server that did not receive the notification, so that these servers may also maintain compliance.

Figure 2:
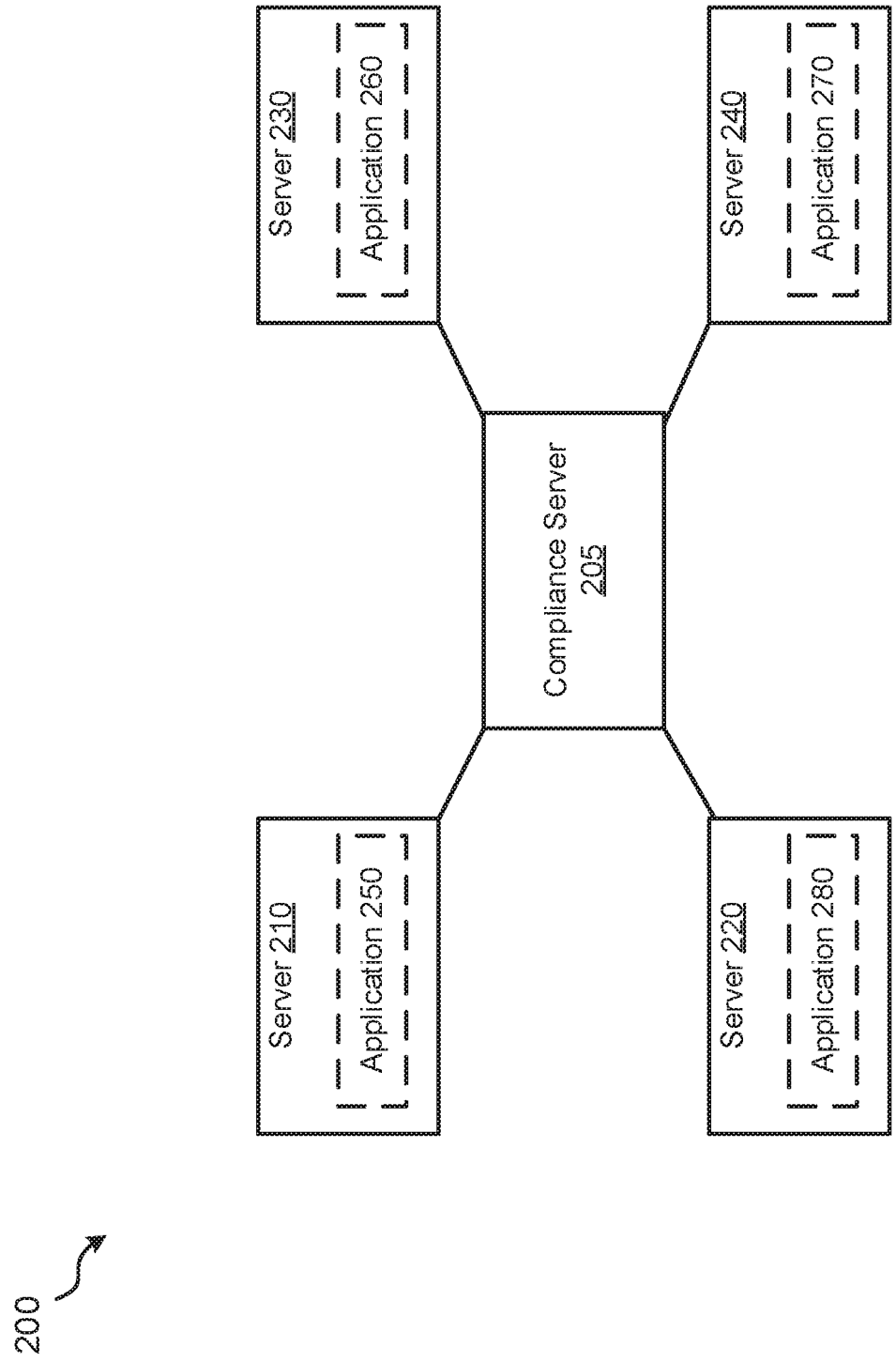
FIG. 2 depicts a block diagram of a first example compliance-checking environment, according to some embodiments.

Referring to FIG. 2, a block diagram of a first example compliance-checking environment 200 is depicted, according to some embodiments. Compliance-checking environment 200 may include compliance server 205, along with servers 210, 220, 230, and 240. Servers 210, 220, 230, and 240 may be customer servers in some embodiments. In some embodiments, compliance server 205 executes method 100 (FIG. 1). As discussed herein, compliance server 205 communicates with servers 210, 220, 230, and 240 (e.g., by sending notifications for compliance-checking, etc.) in order to maintain compliance.

In some embodiments, server 210 manages and/or hosts application 250, server 220 manages and/or hosts application 280, server 230 manages and/or hosts application 260, and server 240 manages and/or hosts application 270. In some embodiments, because servers 210, 220, 230, and 240 all host different applications, servers 210, 220, 230, and 240 may be in different spots in the notification order, based on their criteria. In some embodiments, although servers 210, 220, 230, and 240 host different applications, servers 210, 220, 230, and/or 240 may be in the same, or at least similar, spots in the notification order, based on various specified criteria. For example, server 210 may have similar usage statistics to server 220, so servers 210 and 220 may be in similar spots in the notification order. In another example, both servers 210 and 220 may not have undergone a compliance-check during the last change window (for example, as determined via the compliance-check history). In this example, servers 210 and 220 may be in the same (or similar) spots in the notification order.

Figure 3:
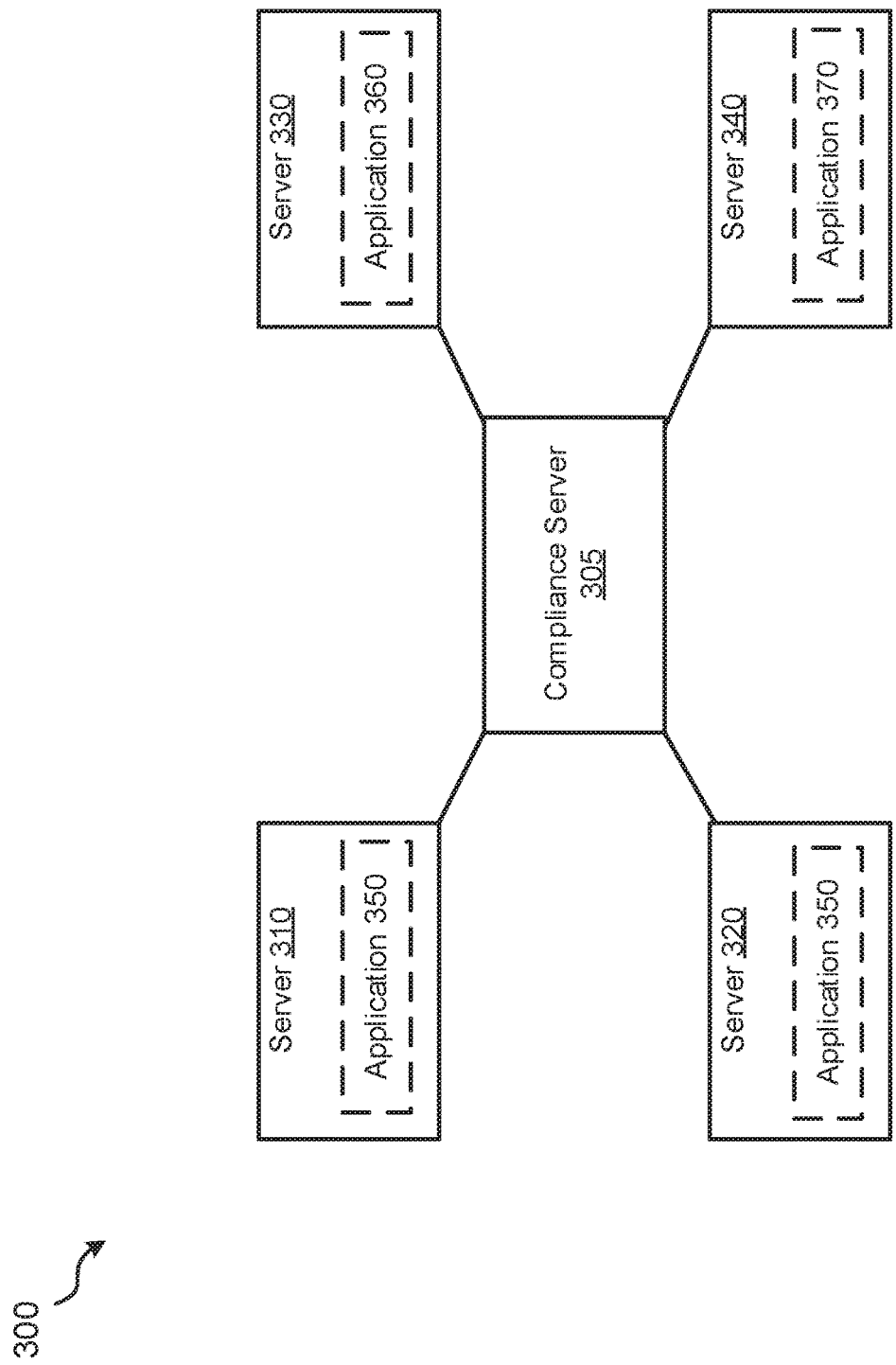
FIG. 3 depicts a block diagram of a second example compliance-checking environment, according to some embodiments.
Figure 4:
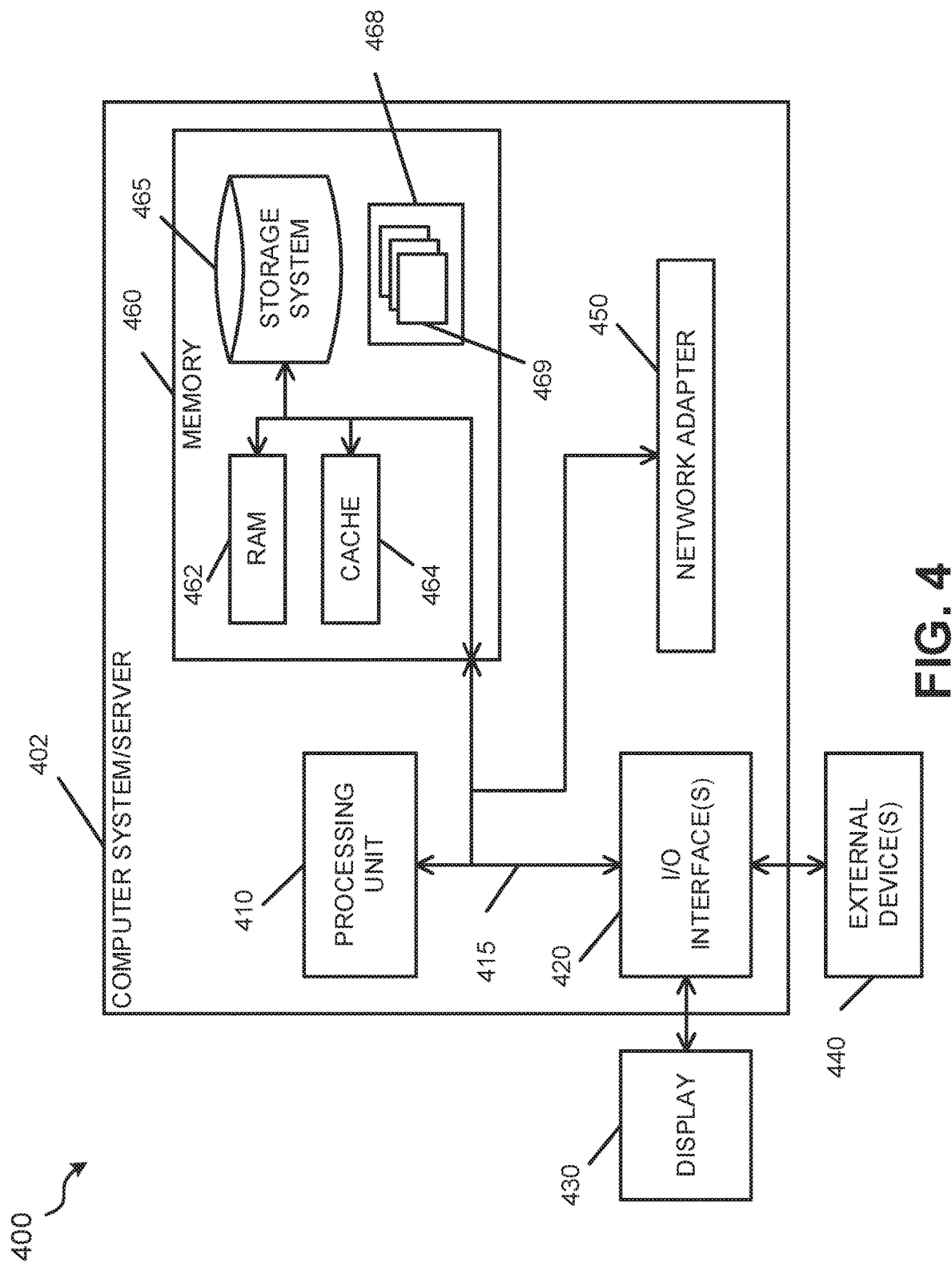
FIG. 4 depicts a block diagram of a sample computer system, according to some embodiments.

Referring to FIG. 3, a block diagram of a second example of a compliance-checking environment, compliance-checking environment 300, is depicted, according to some embodiments. Compliance-checking environment 300 may include compliance server 305, along with servers 310, 320, 330, and 340. Servers 310, 320, 330, and 340 may be customer servers, in some embodiments. In some embodiments, compliance server 305 executes method 100 (FIG. 1). As discussed herein, compliance server 305 communicates with servers 310, 320, 330, and 340 (e.g., by sending notifications for compliance-checking, etc.) in order to maintain compliance.

In some embodiments, both server 310 and server 320 manage application 350. Because both servers 310 and 320 manage the same application, servers 310 and 320 may be in the same spot in the notification order. Therefore, server 310 and server 320 may perform their compliance-checks at the same, or similar times, during a change window, in order to increase the likelihood that application 350 remains compliant.

In some embodiments, server 330 manages and/or hosts application 360 and server 340 manages and/or hosts application 370. As discussed herein, because server 330 and server 340 manage different applications, servers 330 and 340 may have different spots in the notification order, based on their criteria.

Referring to FIG. 4, computer system 400 is a computer system/server 402 is shown in the form of a general-purpose computing device, according to some embodiments. In some embodiments, computer system/server 402 is located on the linking device. In some embodiments, computer system 402 is connected to the linking device. The components of computer system/server 402 may include, but are not limited to, one or more processors or processing units 410, a system memory 460, and a bus 415 that couples various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random-access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the disclosure.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
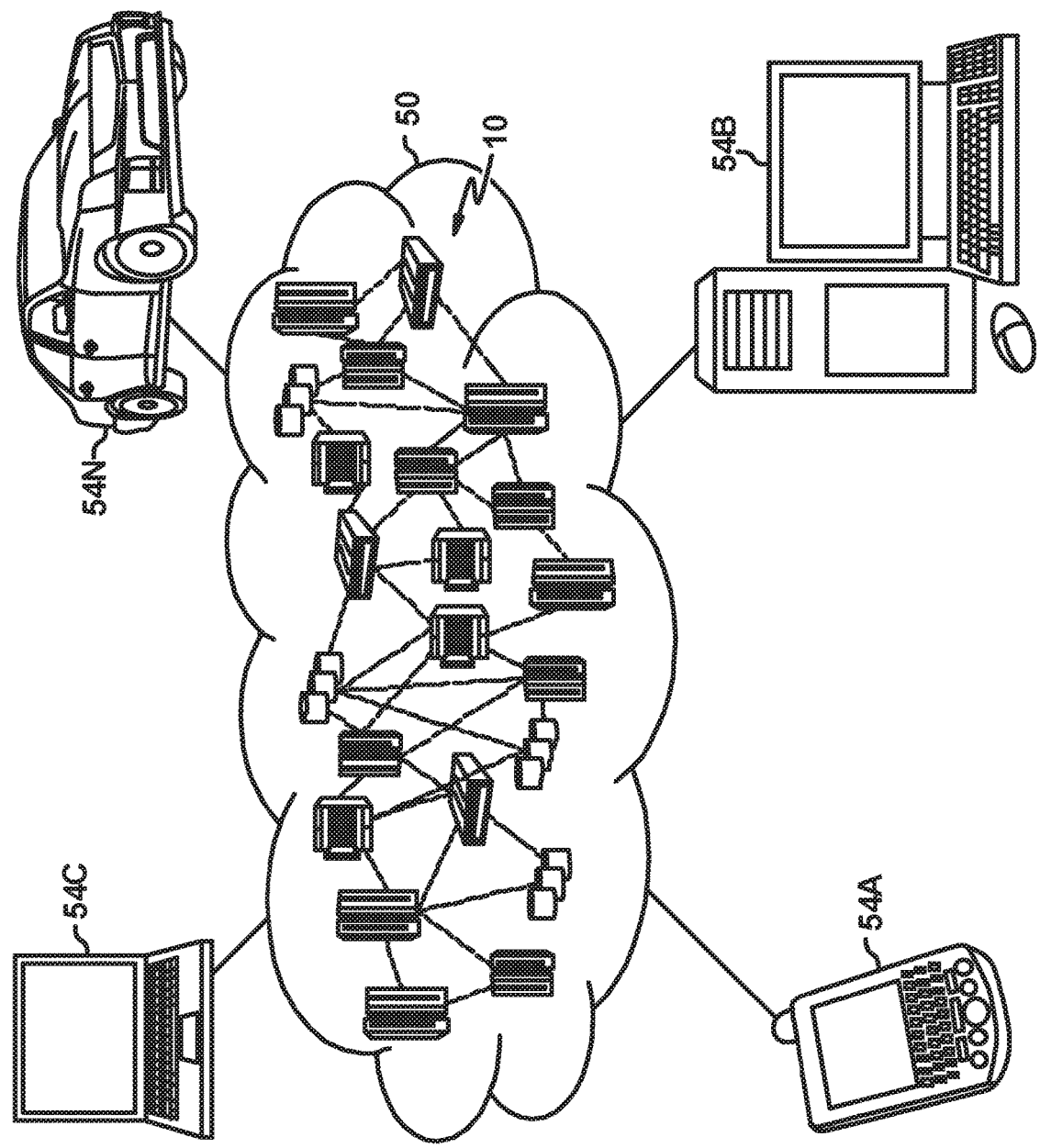
FIG. 5 depicts a cloud computing environment, according to some embodiments.

Referring now to FIG. 5, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
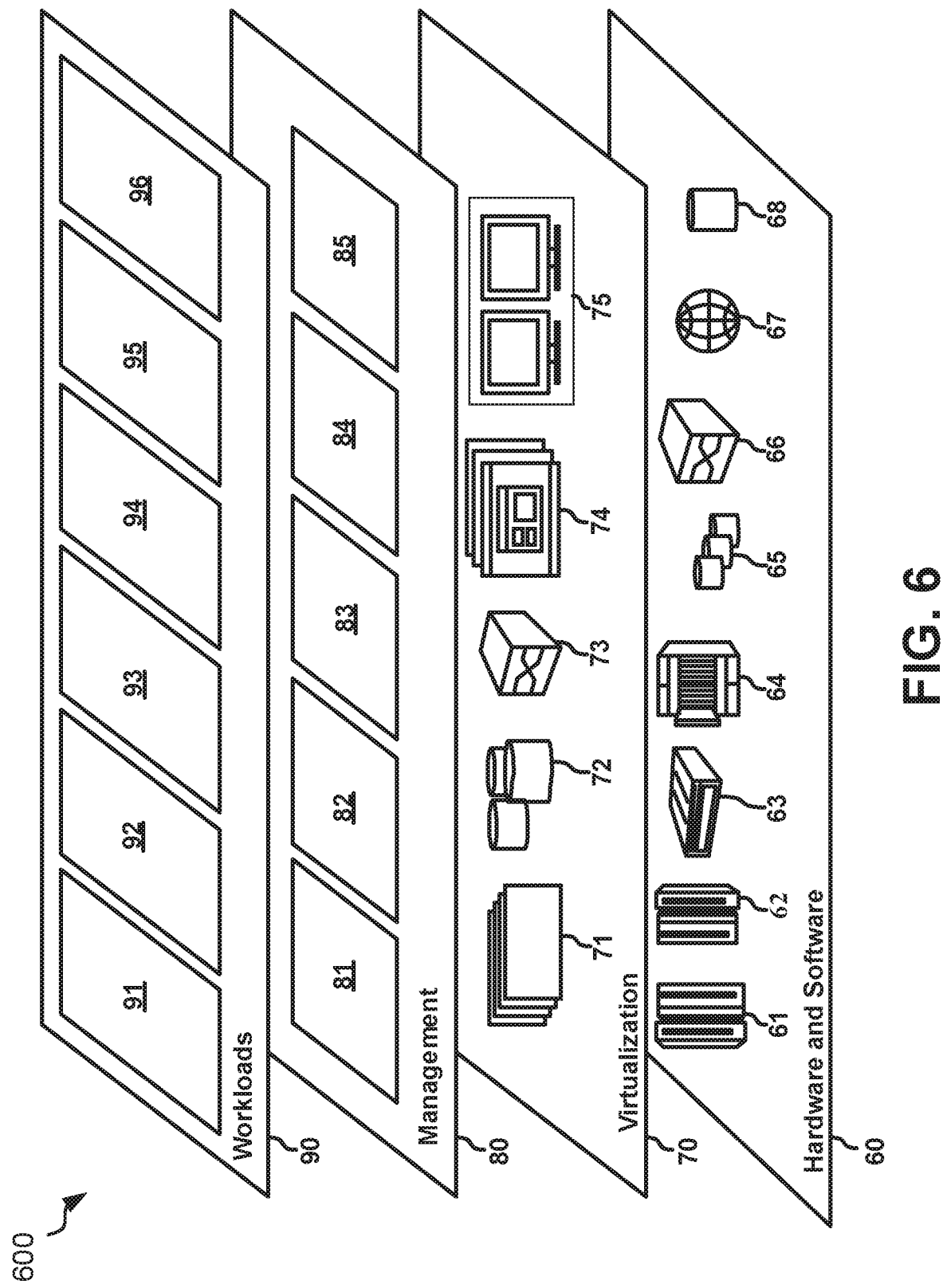
FIG. 6 depicts abstraction model layers, according to some embodiments.

Referring now to FIG. 6, a set of functional abstraction layers 600 provided by cloud computing environment 50 (FIG. 5) is shown, according to some embodiments. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event and workflow processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a request for processing from a plurality of servers;
assigning a priority for each server of the plurality of servers based on specified criteria and customer-defined criteria, wherein the specified criteria includes at least compliance-check history and the customer-defined criteria includes a business criticality service;
determining a notification order for the plurality of servers based on the priority; and
sending a compliance-check notification from a compliance server directly to one or more servers of the plurality of servers to enable server-to-server communication without user intervention, the compliance-check notification including instructions for the one or more servers themselves to initiate a compliance check, wherein the sending is in order of the notification order, wherein changes in an amount of available bandwidth for compliance checking affects the priority of each of the plurality of servers.

2. The method of claim 1, further comprising:
determining whether each server belongs to one or more groups, and wherein the determining the notification order for the plurality of servers is based on whether each server belongs to the one or more groups.

3. The method of claim 2, further comprising:
assigning a first server from the plurality of servers a first spot in the notification order;
determining that the first server belongs to a first group from the one or more groups; and
assigning each server of the first group the first spot in the notification order.

4. The method of claim 3, wherein sending the notification to each server in the notification order comprises:
sending a first notification to the first server and each server of the first group at a first time within a change window.

5. The method of claim 1, wherein the order of the notification order equals an order of the priority of each server.

6. The method of claim 1, wherein the specified criteria comprises at least one of:
usage statistics, risk level, history of compliance-checking, business criticality of a service, and changes to network bandwidth.

7. The method of claim 6, wherein a first group from one or more groups of the plurality of servers comprises servers from the plurality of servers with a same specified criteria.

8. The method of claim 6, wherein the first group comprises servers from the plurality of servers with at least similar usage statistics.

9. The method of claim 1, wherein each of the plurality of servers is assigned a new priority during each change window to enable dynamic server priority assignment.

10. The method of claim 1, wherein sending the notification to each server in the notification order comprises:
sending the notification to a first one or more servers in a first spot of the notification order, wherein the notification includes instructions to perform a compliance-check;
receiving, from the first one or more servers, results of the compliance-check; and
in response to receiving the results, sending the notification to a second one or more servers in a second spot of the notification order.

11. The method of claim 1, wherein the notification is not sent to at least one server from the plurality of servers within a first change window, further comprising:
assigning a high priority to each server that did not receive the notification for a second change window.

12. A system having one or more computer processors, the system configured to:
receive a request for processing from a plurality of servers;
assign a priority for each server of the plurality of servers based on specified criteria and customer-defined criteria including a business criticality service;

determine whether each server belongs to one or more groups;

determine a notification order for the plurality of servers based on the priority and whether each server belongs to the one or more groups; and send a compliance-check notification from a compliance server directly to one or more servers of the plurality of servers to enable server-to-server communication without user intervention, the compliance-check notification including instructions for the one or more servers themselves to initiate a compliance check, wherein the sending is in order of the notification order wherein changes in an amount of available bandwidth for compliance checking affects the priority of each of the plurality of servers.

13. The system of claim 12, further configured to:

assign a first server from the plurality of servers a first spot in the notification order;

determine that the first server belongs to a first group from the one or more groups; and assign each server of the first group the first spot in the notification order.

14. The system of claim 12, wherein the specified criteria comprises at least one of:

usage statistics, risk level, history of compliance-checking, business criticality of a service, and changes to network bandwidth.

15. The system of claim 12, wherein each of the plurality of servers is assigned a new priority during each change window to enable dynamic server priority assignment.

16. A computer program product comprising a non-transitory computer readable storage medium having program instructions embodied therewith, the program instructions executable by a server to cause the server to perform a method, the method comprising:

receiving a request for processing from a plurality of servers;

assigning a priority for each server of the plurality of servers based on specified criteria and customer-defined criteria including a business criticality service;

determining whether each server belongs to one or more groups;

determining a notification order for the plurality of servers based on the priority and whether each server belongs to the one or more groups; and sending a compliance-check notification from a compliance server directly to one or more servers of the plurality of servers to enable server-to-server communication without user intervention, the compliance-check notification including instructions for the one or more servers themselves to initiate a compliance check, wherein the sending is in order of the notification order wherein changes in an amount of available bandwidth for compliance checking affects the priority of each of the plurality of servers.

17. The computer program product of claim 16, further comprising:

assigning a first server from the plurality of servers a first spot in the notification order;

determining that the first server belongs to a first group from the one or more groups; and assigning each server of the first group the first spot in the notification order.

18. The computer program product of claim 16, wherein the specified criteria comprises at least one of:

usage statistics, risk level, history of compliance-checking, business criticality of a service, and changes to network bandwidth.

19. The computer program product of claim 18, wherein each of the plurality of servers is assigned a new priority during each change window to enable dynamic server priority assignment.

\* \* \* \* \*